United States Patent
Walker (10) Patent No.: US 8,255,980 B2
(45) Date of Patent: Aug. 28, 2012

(54) ROUTER CONFIGURATION DEVICE DERIVATION USING MULTIPLE CONFIGURATION DEVICES

(75) Inventor: Dale S. Walker, Houston, TX (US)

(73) Assignee: ERF Wireless, Inc., League City, TX (US)

( * ) Notice: Subject to any disclaimer, the term of this patent is extended or adjusted under 35 U.S.C. 154(b) by 491 days.

(21) Appl. No.: 12/364,612

(22) Filed: Feb. 3, 2009

(65) Prior Publication Data
US 2010/0199329 A1 Aug. 5, 2010

(51) Int. Cl.
*G06F 21/00* (2006.01)
(52) U.S. Cl. ............... 726/4; 726/12; 713/168; 710/301; 709/220; 370/395.53; 370/401
(58) Field of Classification Search ............... 726/4, 12; 713/153, 185, 150, 168; 709/238; 370/401
See application file for complete search history.

(56) References Cited

U.S. PATENT DOCUMENTS

| | | | |
|---|---|---|---|
| 6,912,223 B1 * | 6/2005 | Sloane | 370/401 |
| 7,155,534 B1 * | 12/2006 | Meseck et al. | 709/238 |
| 7,231,518 B1 * | 6/2007 | Bakke | 713/168 |
| 2002/0104016 A1 * | 8/2002 | Pan et al. | 713/201 |
| 2008/0008125 A1 * | 1/2008 | Pham et al. | 370/329 |
| 2008/0155155 A1 * | 6/2008 | Christensen et al. | 710/301 |
| 2008/0235514 A1 * | 9/2008 | Walker | 713/185 |
| 2008/0285759 A1 * | 11/2008 | Shaw | 380/278 |
| 2009/0016357 A1 * | 1/2009 | Blevins et al. | 370/395.53 |
| 2009/0055514 A1 * | 2/2009 | Tebbs et al. | 709/220 |

* cited by examiner

*Primary Examiner* — Philip Chea
*Assistant Examiner* — Dorianne Alvarado David
(74) *Attorney, Agent, or Firm* — Conley Rose, PC (57) ABSTRACT

Systems and methods for managing router configuration devices in a secure data communication network are described herein. An illustrative system includes a plurality of programmed external configuration devices and a configuration device programmer. Each programmed external configuration device contains at least a portion of a definition of a secure data path between a first router and a second router. Each programmed external configuration device can be detachably coupled to a first router to create a secure data path between the first router and a second router. The configuration device programmer writes a secure data path definition into a selected external configuration device if a predetermined number of programmed external configuration devices are coupled to the configuration device programmer.

20 Claims, 5 Drawing Sheets

ROUTER CONFIGURATION DEVICE DERIVATION USING MULTIPLE CONFIGURATION DEVICES

RELATED APPLICATIONS

This application contains subject matter that may be related to U.S. Nonprovisional application Ser. No. 11/533,652, filed Sep. 20, 2006 and entitled "Router for Use in a Monitored Network," to U.S. Nonprovisional application Ser. No. 11/533,672, filed Sep. 20, 2006 and entitled "Monitoring Server For Monitoring A Network Of Routers," to U.S. Nonprovisional application Ser. No. 11/689,712, filed Mar. 22, 2007 and entitled "Safeguarding Router Configuration Data," and to U.S. Nonprovisional application Ser. No. 11/777,704, filed Jul. 13, 2007 and entitled "Separate Secure Networks Over a Non-Secure Network" all of which are herein incorporated by reference.

BACKGROUND

Routers are electrical devices that are used to permit computers and networks of computers to pass data back and forth. A router typically has one or more input ports and one or more output ports. Data packets containing a destination address arrive on an input port. Based on the destination address, the router forwards the data packet to an appropriate output port which may be connected to the destination computer system or to another router. The data being transmitted between routers may be confidential (e.g., bank account data in the context of a bank's network) and thus the security of such data should be ensured. Accordingly, at least some routers provide encryption to allow secure communications across an untrusted communication channel, such as the Internet.

Additionally, some such routers provide additional security to protect the configuration of the routers themselves. Such configuration protection measures may operate by requiring that a configuration device be coupled to a router to establish communication pathways between routers. A configuration device may include encryption keys specifying how encodings are to be used between routers. Such a system of routers may be further secured by ensuring that the inter-router encryption keys are randomly created, and thus cannot be duplicated. While resulting in enhanced network security, such measures may make network maintenance burdensome. If a configuration device must be replaced, or a new router added to the network, a complete set of configuration devices must be generated. Flexible methods of generating configuration devices while maintaining system security are desirable.

SUMMARY

Systems and methods for generating configuration devices in a secure data communication network are described herein. The disclosed systems and methods allow a secure network that employs external configuration devices defining the secure pathways between routers to be locally reprogrammed. Network security is maintained, at least in part, by requiring that a predetermined number of external configuration devices be coupled to a configuration device programmer to enable programming. Each configuration device may be controlled by a different user, and the identity of each user presenting a configuration device may be authenticated. Thus, a plurality of authenticated users that control the configuration devices may be required to act in concert to enable programming. Moreover, a secret value may be shared among the external configuration devices of the network. The secret value may be used, for example, to access a master encryption key. The external configuration device programmer may determine the secret value only if a predetermined number of external configuration devices are coupled to the programmer.

In accordance with at least some embodiments, a system includes a plurality of programmed external configuration devices and a configuration device programmer. Each programmed external configuration device contains at least a portion of a definition of a secure data path between a first router and a second router. Each programmed external configuration device can be detachably coupled to a first router to create the secure data path between the first router and a second router. The configuration device programmer writes a secure data path definition into a selected external configuration device if a predetermined number of programmed external configuration devices are coupled to the configuration device programmer.

In other embodiments, a method includes detecting the coupling of a predetermined plurality of programmed external configuration devices to a configuration device programmer. Each programmed external configuration device contains secure data path information that, at least in part, defines a secure data path between two network devices. Secure data path information is written to a selected external configuration device based, at least in part, on the detection of coupling of the predetermined plurality of programmed external configuration devices to the configuration device programmer.

In yet other embodiments, a router configuration system includes an external configuration device and means for writing a secure data path definition to the external configuration device. The external configuration device can be programmed to store a definition of a secure data path between a first router and a second router. A programmed external configuration device can be detachably coupled to the first router to create the secure data path between the first router and the second router. The means for writing is enabled to write the secure data path definition into the external configuration device if a predetermined plurality of programmed external configuration devices is coupled to the means for writing.

BRIEF DESCRIPTION OF THE DRAWINGS

For a detailed description of the illustrative embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

Additionally, the term "system" refers to a collection of two or more hardware and/or software components, and may be used to refer to an electronic device, such as a computer, a network router, a portion of a computer or a network router, a combination of computers and/or network routers, etc. Further, the term "software" includes any executable code capable of running on a processor, regardless of the media used to store the software. Thus, code stored in non-volatile memory, and sometimes referred to as "embedded firmware," is included within the definition of software. Also, the term "secure," within the context of secure data, indicates that data has been protected so that access by unauthorized personnel is either prevented, or made sufficiently difficult such that breaching the protection measures is rendered impractical or prohibitively expensive relative to the value of the data.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Routers are sometimes used as transfer points between secured and unsecured networks. When so utilized, the routers may be configured to protect data originating from, or destined for, a secure network and/or device. Such protection may include encryption of the data prior to transmission across an unsecured network (e.g., IPSec, RSA Public/Private Key Encryption, and Virtual Private Networks) as well as secure and/or encrypted authentication of a router on one end of the transaction by the router at the other end of the transaction (e.g., digital signatures). Because the configuration of these routers is a key element to ensuring data security, it is important to secure and control access to the configuration data of such routers. Embodiments of the present disclosure provide such security by requiring access to each router in a network through a unique external configuration device. At least one external configuration device is provided for each router in the network. Each external configuration device contains information defining data paths to other network routers, including encryption keys for use on those paths. Some embodiments include no means of reconstructing the secure data path information stored in an external configuration device. Lack of a means to duplicate the path information enhances network security, but requires that external configuration devices for all network routers be replaced if an external configuration device must be replaced or a router added to the network. Embodiments of the present disclosure allow for programming of an external configuration device when a predetermined number of previously programmed external configuration devices are coupled to a configuration device programmer. The configuration device programmer can be any system capable of reading and writing an external configuration device.

Figure 1:
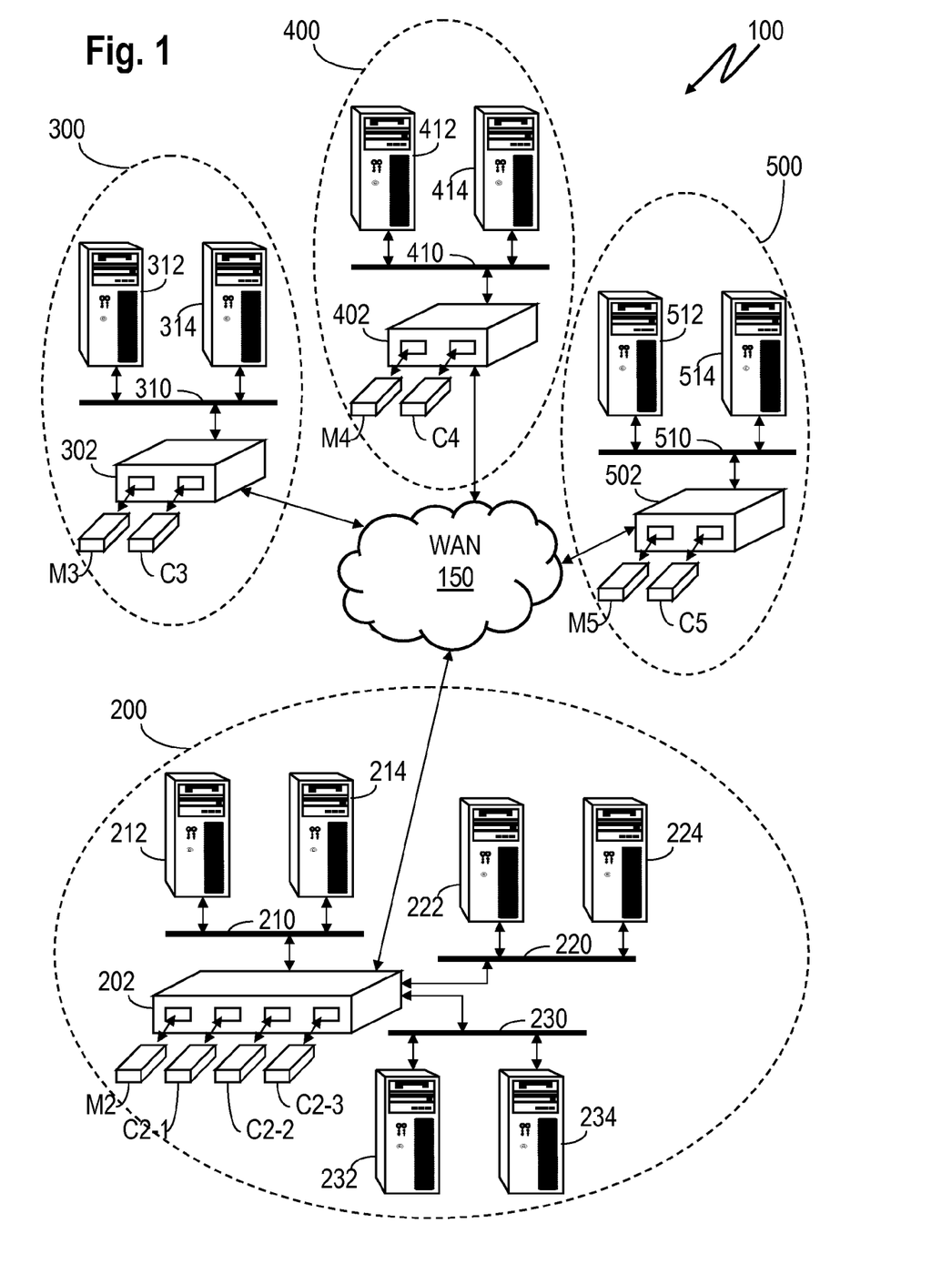
FIG. 1 shows a network routing system utilizing a router constructed in accordance with at least some illustrative embodiments.

FIG. 1 shows a networked system 100 that incorporates a router 202, constructed in accordance with at least some illustrative embodiments, that provides the distributed configuration control described above. Although the illustrative embodiment shown and described includes a network router, other illustrative embodiments may include different or additional devices, such as network switches and/or hubs, and all such devices are within the scope of the present disclosure. Four sub-networks (200, 300, 400 and 500) are shown that couple to each other via wide area network (WAN) 150. A WAN 150 as defined herein comprises any network and networking technology used to connect local area networks. Each sub-network comprises a router (202, 302, 402 and 502 respectively) that provides connectivity between WAN 150 and one or more local area networks (LANs) coupled to each router. The LANs within each sub-network (LANs 210, 220, 230, 310, 410 and 510) couple one or more computer systems (212, 214, 222, 224, 232, 234, 312, 314, 412, 414, 512 and 514) to the router corresponding to a given sub-network, thus providing each computer system on each LAN connectivity to WAN 150 and to each of the other computer systems on each LAN.

Each router isolates the LANs to which the router couples from WAN 150 and other LANs by controlling and verifying where data is allowed to be sent and received, and by encrypting data before it is transmitted across WAN 150. For example, if a user wishes to transmit secure data from computer system 212 on LAN 210 to computer system 514 on LAN 510, router 202 is configured to allow the specific type and security level of data to be transmitted from computer system 212 to computer system 514 by the user attempting to send the data. Router 202 establishes a connection with router 502 and sets up a "tunnel" or secure data path through WAN 150 wherein the contents of the packets, including the network protocol headers of the messages as received from the respective LANs, are encrypted and encapsulated according to the networking protocol of WAN 150 (e.g., TCP/IP and IPsec). In this manner the data being transmitted (and its LAN headers) appears in clear text form only on the source and destination LANs, and is otherwise visible on all other intervening networks only in encrypted form.

The security of the "tunneled" data (encrypted, encapsulated and transmitted across WAN 150) depends significantly on the security of the configuration of each of the routers. In at least some illustrative embodiments, each router of FIG. 1 protects its configuration through the use of an external maintenance device (M2, M3, M4 and M5), and one or more external configuration devices (C2-1, C2-2, C2-3, C3, C4 and C5), each of which is under the control of a separate user. Each separate user and/or each external device must be authenticated by the router to which the devices couple before the configuration of the router can be loaded and/or modified. In at least some illustrative embodiments, the devices are non-volatile storage devices. The devices couple to the routers by a variety of means. In some embodiments, the devices physically couple to the routers via, for example, Universal Serial Bus (USB) style connectors.

As can be seen in the illustrative embodiment of FIG. 1, routers 302, 402 and 502 each utilize a single maintenance device (M3, M4 and M5) and a single configuration device (C3, C4 and C5) to configure each router. Each device may be under the control of separate individuals or organizations, and each device as well as each user of each device may be authenticated by the router. As a result, in at least some illustrative embodiments a minimum of two individual users are required to alter the configuration of a router. Additional individuals or organizations may be assigned physical control of each configuration device (i.e., custodians of the devices), further enhancing security and discouraging collusion among malicious users. Upon initialization or reconfiguration of the router, each device coupled to the router is authenticated by decrypting encrypted identification data stored on the device, using an embedded decryption key stored within the router. Each user of each device may be authenticated by comparing authentication data provided by a user against reference authentication data stored either within the router or within the device presented by the user. The authentication data may be provided by the user in the form of a user ID and password entered via a keyboard and/or mouse coupled to the router, or in the form of biometric data, such as a fingerprint provided via an appropriate scanning device coupled to the router, or coupled to the external device. Other mechanisms for providing user authentication data will become apparent those of ordinary skill in the art, and all such mechanisms are within the scope of the present disclosure.

Continuing to refer to FIG. 1, router 202 utilizes maintenance and configuration devices similar to those used by the other routers, but is capable of accepting multiple configuration devices. Each configuration device (C2-1, C2-2 and C2-3) is capable of configuring router 202 to route data and to connect to source and destination computer systems under the control of specific individuals and/or organizations, each of which control access to each configuration device, and each of which may be required to provide separate authentication data for their corresponding device. By providing separate configuration data, router 202 may be configured to provide multiple secure data paths, each under the configuration control of a separate individual and/or organization. Thus, for example, router 202 can establish a first tunnel between router 202 and router 502 to route data securely from computer system 212 to computer system 512. While the first tunnel is operative, router 202 can establish a second, separate tunnel between router 202 and router 302 to route data from computer system 224 to computer system 312. Those of ordinary skill in the art will recognize that any number of such tunnels can be established by router 202.

The configuration allowing the first tunnel to be setup and used may be controlled by a first authorized user (e.g., a financial officer of a first bank) and used to route one type of data (e.g., confidential financial data), while the configuration allowing the second tunnel to be setup and used may be controlled by a second authorized user (e.g., a network engineer) and used to route the same or different type of data (e.g., network monitoring data). Each tunnel is allowed and setup based upon configuration data provided by a corresponding configuration device, presented to the router in conjunction with the maintenance device, and loaded into volatile storage within the router as part of the router's configuration. Thus, for example, configuration device C2-1 provides the configuration data and/or at least some of the authentication data related to routing data from computer system 212 to computer system 512 via one tunnel, while configuration devices C2-3 provides the configuration and/or authentication data related to routing data from computer system 224 to computer system 312 via another tunnel.

Although the example described above divides the configuration stored in each configuration device based upon destination address of the computer systems and/or networks, other divisions are possible. Tunnels may be established based upon the type of data being transferred (e.g., financial data, network monitoring data, and camera and alarm data), and/or based upon who controls access to the data (e.g., a bank official, a security officer, or network maintenance personnel). For example, data provided by computer system 212 may include financial data from one bank that is being sent to computer system 414 at another bank. At the same time, the first bank may also provide video surveillance data from its security computer system to local police departments on an "as needed" basis if an alarm is detected.

Banking regulations generally do not allow any external, non-banking entities, such as a police department, to connect directly to a bank's network 210, due to the presence of confidential banking data on network 210. Router 202 provides a separate, secure tunnel through which only the video surveillance data is routed to such an external entity without giving the entity direct access to network 210, and without compromising confidential banking data. The tunnel is encrypted using different keys than the banking data, and is routed to a computer system operated by the police department (e.g., computer system 514) based upon rules that allow only this type of data to be routed to the police department's computer system. These rules are stored on a separate configuration device, under the control of a person authorized to configure the routing of the video surveillance data, but not the financial data. As a result, the police department does not gain access to the banking data, the decryption keys used to decrypt the video surveillance data cannot be used to decrypt the banking data even if the police department did gain access to the financial data, and the person authorized to use the surveillance configuration device cannot alter the configuration of router 202 to gain access or decrypt banking data present on network 210.

Figure 2:
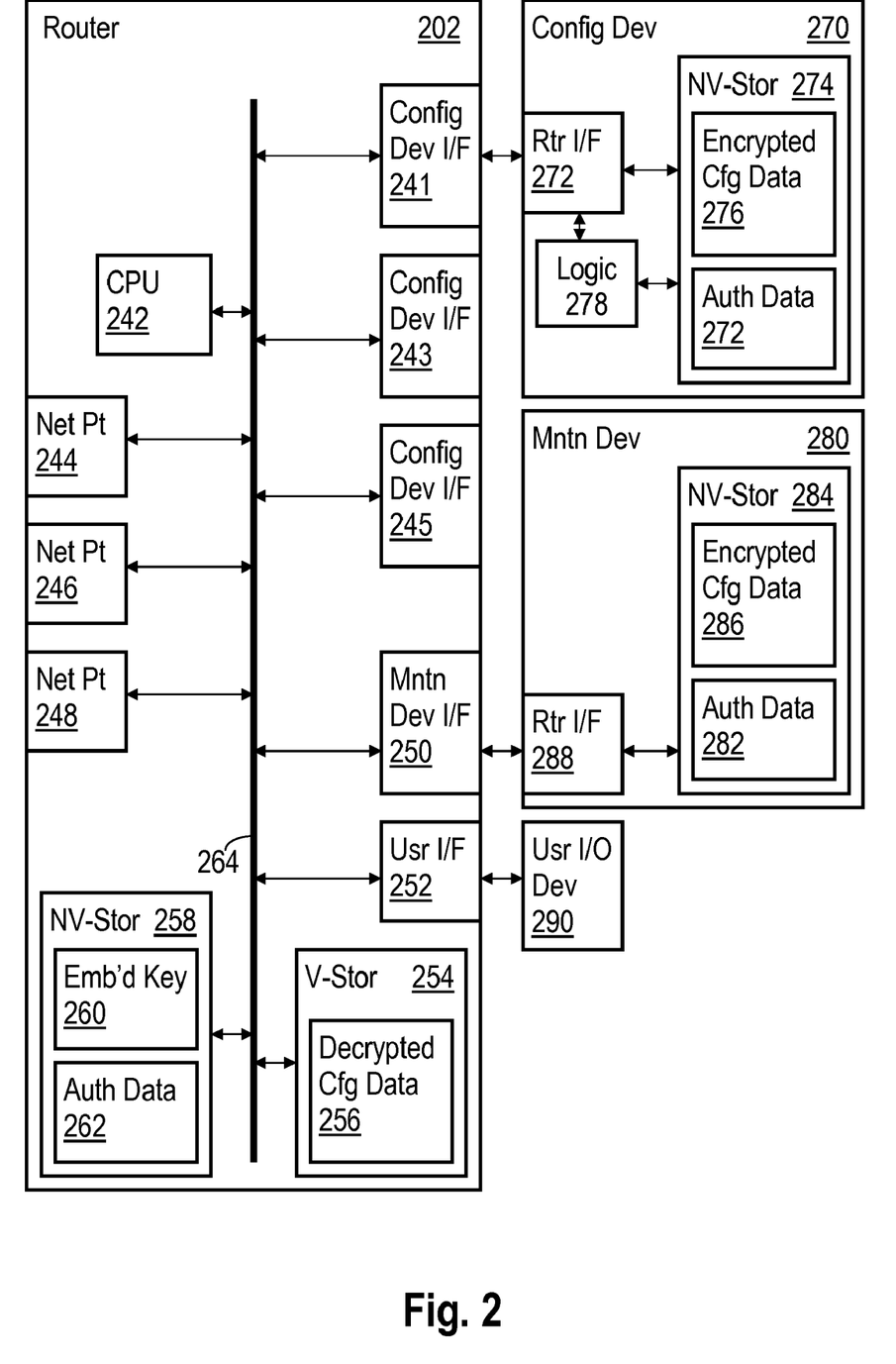
FIG. 2 shows a configuration device and a maintenance device, both coupled to a router constructed in accordance with at least some illustrative embodiments.

FIG. 2 shows a block diagram that details a router 202, constructed in accordance with at least some illustrative embodiments, and further details a configuration device 270 and a maintenance device 280, both coupled to router 202. Router 202 includes central processing unit (CPU) 242, network ports (Net Pts) 244, 246 and 248, configuration device interfaces (Config Dev I/Fs) 241, 243 and 245, maintenance device interface (Mntn I/F) 250, user interface (Usr I/F) 252, volatile storage (V-Stor) 254, and non-volatile storage (NV-Stor) 258, each of which couple to a common bus 264. CPU 242 controls the routing of data between network ports 244, 246 and 248, based on decrypted configuration data (Decrypted Cfg Data) 256 stored within volatile storage 254. The configuration data is stored in encrypted form within configuration device (Config Dev) 270, which detachably couples to router 202 via configuration device interface 241. Configuration device 270 includes router interface (Rtr I/F) 272 and non-volatile storage 274, each coupled to the other. Rtr I/F 272 may employ any of a variety of interface means to couple to Config Dev I/F 241 of the router 202. Such means include, for example, wired, optical, and/or wireless connections. Accordingly, Rtr I/F 272 comprises circuitry to implement the chosen interface, including, for example, a radio frequency transmitter and receiver. Non-volatile storage 274 stores encrypted configuration data (Encrypted Cfg Data) 276, which is retrieved by CPU 242 of router 202 while configuration device 270 is coupled to configuration device interface 241. CPU 242 may use embedded key (Emb'd Key) 260, stored within non-volatile storage 258, to decrypt the encrypted configuration data 276 to produce at least some of decrypted configuration data 256. In some embodiments, the configuration data 276 is stored as plaintext, and thus is read from non-volatile storage 270 and written as decrypted configuration data 256 in volatile storage 254 without application of decryption. Such embodiments may not include the embedded key 260.

Maintenance device 280 includes router interface (Rtr I/F) 288 and non-volatile storage 284, each coupled to the other. Like Rtr I/F 272 described above, Rtr I/F 282 may employ any of a variety of interface means including, for example, wired, optical, and/or wireless connections to couple to Config Dev I/F 250 of the router 202. Non-volatile storage 284 stores additional encrypted configuration data (Encrypted Cfg Data) 286, which is retrieved by CPU 242 of router 202 while maintenance device 280 is coupled to maintenance device interface 250. CPU 242 may use embedded key (Emb'd Key) 260, stored within non-volatile storage 258, to decrypt the additional encrypted configuration data 286 to optionally produce at least some of decrypted configuration data 256. Maintenance device 280 is not required for normal operation of the router ("normal mode"), but is instead used to place the router into a "maintenance mode," wherein authorized maintenance personnel can perform scheduled maintenance of the router, and/or troubleshoot problems with the router and network.

Access to the embedded key 260, and thus to the configuration data required to operate the router 202 may be controlled through the use of user-provided authentication data. In at least some illustrative embodiments, the authentication data is provided by a user operated user input/output device (Usr I/O Dev) 290, which is coupled to user interface 252. In some embodiments, the authentication data is provided by a user operated user input device coupled to the configuration device 270 and/or the maintenance device 280. The input provided by the user may be in the form of a password, or in the form of biometric data (e.g., scanned fingerprint or retina data). The authentication data may then be compared to stored and/or encrypted reference copies of the authentication data, which may be stored locally within router 202 in non-volatile storage 258 (Auth Data 262), externally in non-volatile storage 274 within configuration device 270 (Auth Data 272), and/or externally in non-volatile storage 284 within maintenance device 280 (Auth Data 282).

It should be noted that although the illustrative embodiment of FIG. 2 does not show additional configuration devices coupled to configuration device interfaces 243 and 245, any number of configuration devices, up to the number of available configuration device interfaces, may be coupled to router 202. Decrypted configuration data 256, stored in volatile storage 254, results from decrypting and combining the encrypted configuration data stored in each configuration device (and optionally the maintenance device) coupled to router 202. Other illustrative embodiments may include any number of configuration device interfaces. Also, software executing on CPU 242 may allow multiple configuration devices to be sequentially coupled to, authenticated, and uncoupled from a single configuration device interface, extending the number of configuration devices that may be used to configure the router. Other techniques and configurations for increasing the number of configuration devices that may be used to configure router 202 will become apparent to those of ordinary skill in the art, and all such techniques and configurations are within the scope of the present disclosure.

As described above, the security of network 100 is enhanced by providing configuration data to the network routers via at least one external configuration device per router. The external configuration device contains information defining the various pathways between the router and other network routers. In some embodiments the encryption keys, stored in the external configuration device, for application to the inter-router pathways are randomly generated, and to further enhance network security, no record of the encryption keys is maintained. In such embodiments, if an external configuration device must be replaced, or a router is added to the network, a new external configuration device for each the routers in the network must be generated. Generally, external configuration devices are programmed at a central production site. Simultaneous replacement of the external configuration devices for all network routers is reasonably feasible for small networks, but becomes increasingly burdensome as network size increases.

Figure 3:
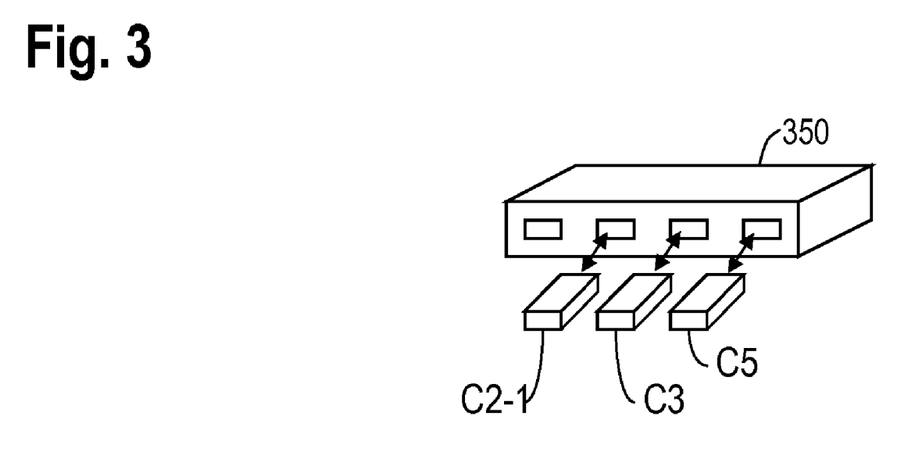
FIG. 3 shows a configuration device programmer and a plurality of external configuration devices in accordance with various embodiments.

Embodiments of the present disclosure provide for local programming of one or more external configuration devices while maintaining the security of network configuration information. FIG. 3 shows a configuration device programmer 350 and a plurality of external configuration devices C2-1, C3, C5 in accordance with various embodiments. In one embodiment, the configuration device programmer 350 generates router configuration data 276 stored in an external configuration device (e.g. C3) and writes the data into the configuration device. The security of the configuration device programmer 350 and the information it generates is maintained by requiring that a plurality of external configuration devices C2-1, C3, C5 each preferably controlled by a different individual be coupled to the configuration device programmer 350 to enable configuration device generation. Thus, no single individual can initiate programming of an external configuration device. The exemplary embodiment of FIG. 3 requires coupling of three previously programmed external configuration devices to the configuration device programmer 350 before the programmer provides device generation. However, various embodiments of the present disclosure may require coupling of more or fewer programmed external configuration devices to the configuration device programmer 350. Moreover, some embodiments may require that certain specific external configuration devices, or external configuration devices controlled by specified individuals be coupled to the device programmer 350.

The configuration device programmer 350 may be implemented as a computer executing software programming providing the various functions disclosed herein. Such a computer generally comprises a processor coupled by one or more buses to various data and program storage devices, such as hard drives, optical storage devices, random access memory, or read only memory, and to various input/output devices, for example, keyboards, network adapters, displays, etc. In some embodiments, a router (e.g., 202) as described herein that includes external configuration device programming software may serve as the configuration device programmer 350.

Similar to router configuration, as explained above, each individual presenting an external configuration device to the configuration device programmer 350 may be required to authenticate his identity. Requiring authentication ensures that only authorized individuals may provide a configuration device to the programmer 350. Authentication can be by password entry, or through biometric data, such as fingerprints, retinal scans, etc. Means for entering the authentication data, e.g., keyboard, fingerprint scanner, etc., can be provided by the configuration device programmer 350 and/or the external configuration device.

In some embodiments, coupling a pre-determined number of external configuration devices to the configuration device programmer 350, and/or authenticating the identities of the individuals providing the devices enables the configuration device programmer 350 to generate new information (e.g., encrypted configuration data 276) for each external configuration device in the network. The information written into each external configuration device by the programmer 350, for example, authentication data 272, and/or router configuration data 276, may be derived from any of a variety of sources. For example, such information may be read from previously programmed configuration devices coupled to the device programmer 350 and stored within the programmer 350 in some embodiments. In some embodiments, programming information may be provided to the device programmer 350 by user entry, or extracted via a data storage device, such as an optical disk reader coupled to the device programmer 350. Thus, for example, to replace an entire set of configuration devices, a pre-determined number of configuration devices are coupled to the programmer 350 to enable programming, the programmer 350 generates new encryption keys for application to the router data paths, and the appropriate encryption keys are written to each associated configuration device subsequently coupled to the programmer 350.

In some embodiments, coupling a predetermined number of network router external configuration devices to the configuration device programmer 350, and preferably authenticating the identities of the individuals providing the devices enables the configuration device programmer 350 to generate information needed to program a replacement for an existing external configuration device. A replacement device may be needed if, for example, an existing external configuration device malfunctions. Such embodiments allow for the generation of a configuration device without requiring that the remaining configuration devices be reprogrammed. In one embodiment, the information required to program a replacement configuration device, for example, encryption keys, etc., used by the router network, may be derived from one or more configuration devices coupled to the configuration device programmer 350. In another embodiment, the configuration device programmer 350 may access a repository of configuration data that resides on the device programmer 350 or is provided to the device programmer via a storage device coupled to the programmer 350.

In another embodiment, coupling a predetermined number of network router external configuration devices to the configuration device programmer 350, and optionally authenticating the identities of the individuals providing the devices enables the configuration device programmer 350 to generate information needed to program a new external configuration device. A new external configuration device is needed when adding a router to the network. At least some information required to program the new configuration device can be provided by one or more existing external configuration devices coupled to the device programmer 350. For example, identification of other routers in the network and encryption keys for the secure data paths used by inter-router communication. Other information, such as authentication data to be applied to the new configuration device can be provided via operator entry and/or a storage device coupled to the programmer 305 that contains the information. Note that when adding a new router to the network, the configuration device associated with each router that will communicate with the new router must also be reprogrammed to include the required secure data path information.

Figure 4:
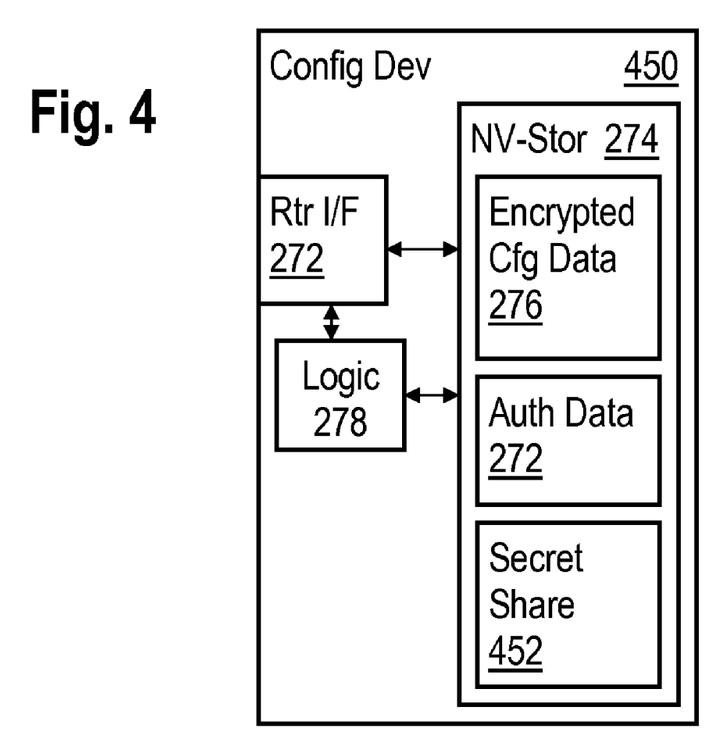
FIG. 4 shows an external configuration device including a secret share in accordance with various embodiments.

In another embodiment, each external configuration device contains information that when combined with information contained in other external configuration devices provides a secret value, for example, an encryption key or authentication value that the configuration device programmer 350 applies to gain access to network router configuration data or to enable configuration device programming. FIG. 4 shows an external configuration device 450 including a secret share 452 (i.e., a share of a secret value) in accordance with various embodiments. In such embodiments, information (i.e., the secret share 452) from which the secret value can be obtained is programmed into each external configuration device 450 in the network/sub-network. The secret share 452 is devised such that the secret value cannot be revealed by combining less than a predetermined number of secret shares. Stated differently, if the network employs N configuration devices, and M of the N configuration devices are required to determine the secret value, the secret shares of M−1 configuration devices are insufficient to produce the secret value. In some embodiments, combining M−1 secret shares reveals nothing about the secret value.

Various M of N secret sharing schemes can be used. For example, one M of N secret sharing scheme begins with selection of a secret value, S, and a number of devices, M, required to reveal the secret value. An M−1 degree polynomial is constructed over a finite field, such that the constant term of the polynomial is the secret S and all the other polynomial coefficients are random elements of the field. The secret share 452 is point derived by evaluating the polynomial. Given M out of N secret shares, Lagrange interpolation can be applied to find the polynomial and reveal the secret S contained in the constant term.

Figure 5:
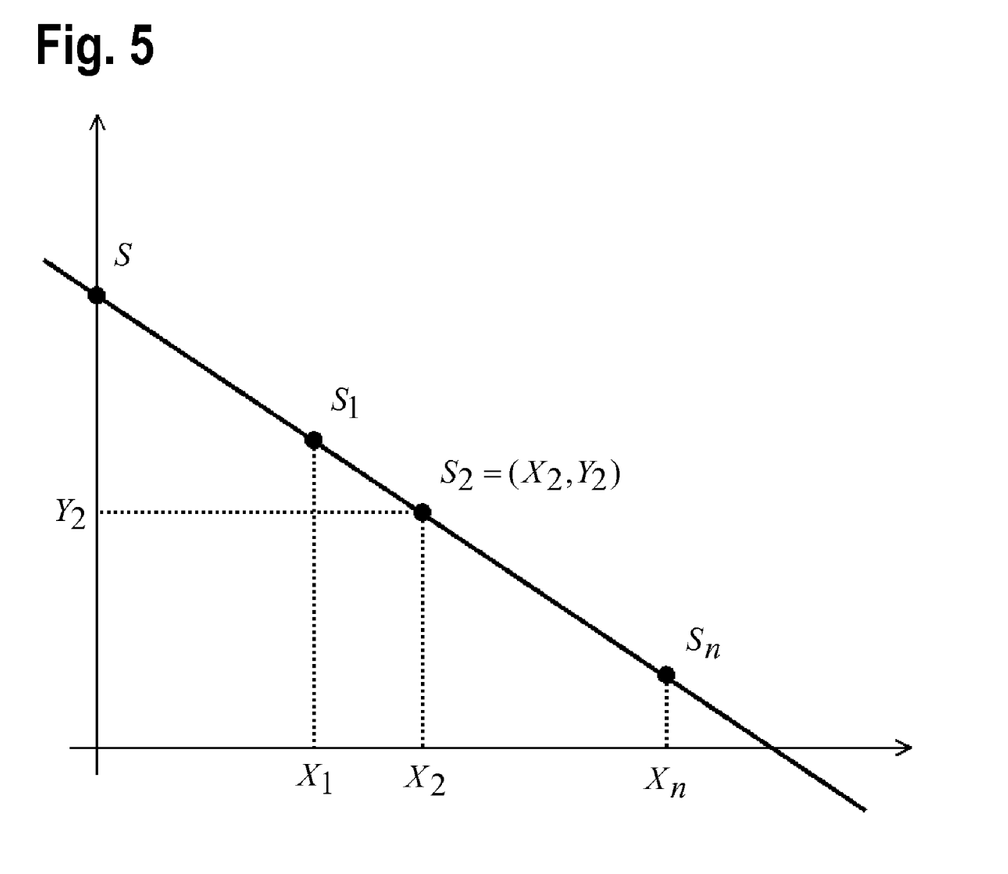
FIG. 5 shows a graphical representation of secret sharing using a first-degree polynomial in accordance with various embodiments.

FIG. 5 shows a graphic representation of secret sharing using a first-degree polynomial in accordance with various embodiments. M=2 for the first-degree polynomial, so two shares are required to determine a secret distributed among N shareholders. Here, the secret value S is the value of the y-intercept of the line, and each share is a point on the line. In practice, the line passing through the y-intercept S may be chosen at random. No information about S can be obtained from a single share (point) because an infinite number of different lines pass through each point. However, the secret value S can be easily determined if two points are known.

To extend the principle to M=3, begin with the secret value S and choose, at random, two coefficients for a second-degree polynomial (i.e., a quadratic function). The secret value S serves as the constant of the quadratic function. The secret shares are points derived by evaluating the polynomial. As described above, the secret value S may be determined by applying Lagrange interpolation if three points of the polynomial are known (i.e., three shares are known), but no information about the secret can be derived from less than three shares. The above-disclosed secret sharing scheme has been described as applicable to embodiments of the present disclosure, however, many different secret sharing schemes are possible and all are encompassed by various embodiments of the present disclosure. Moreover, embodiments are not limited to any particular number of secret shares required to determine a secret value.

Figure 6:
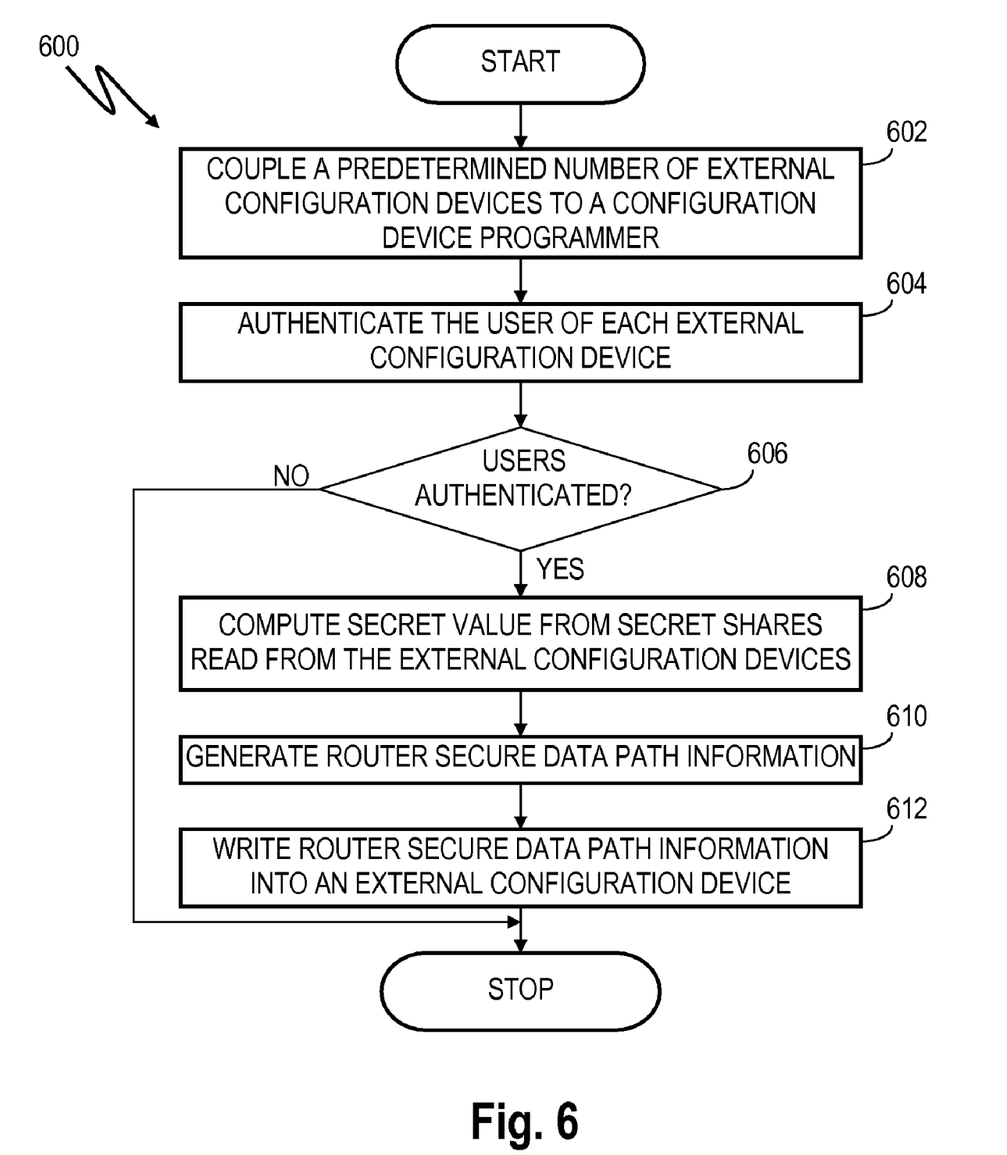
FIG. 6 shows a flow diagram for a method for programming an external configuration device in accordance with various embodiments.

FIG. 6 shows a flow diagram for a method 600 for programming an external configuration device (e.g., C3) in accordance with various embodiments. Though depicted sequentially as a matter of convenience, at least some of the actions shown can be performed in a different order and/or performed in parallel. Moreover, some embodiments may perform only some of the illustrated actions. In block 602, a predetermined number of programmed external configuration devices containing router secure data path information are coupled to and detected by a configuration device programmer 350. For example, some embodiments require that three external configuration devices be coupled to the configuration device programmer 350. Presentation of the predetermined number of external configuration devices enables the programmer 350 to generate new configuration data for programming into one or more external configuration devices of the network.

In block 604, the identity of each user of an external configuration device coupled to the configuration device programmer 350 may be authenticated. Authentication may be by a variety of means. For example, the user can be required to enter a secret password, or to supply biometric data, such as a fingerprint, retinal scan, etc. The entry means, for example, a keyboard, fingerprint scanner, retinal scanner, etc. may be coupled to the configuration device programmer and/or the external configuration device. If, in block 606, user authentication fails, indicating that an unauthorized user is presenting an external configuration device to the configuration device programmer 350, then external configuration device programming is terminated.

If the configuration device users are successfully authenticated in block 606, then, in at least some embodiments, the configuration device programmer 350 reads a secret share 452 from each configuration device 450 and computes a secret value. Embodiments can apply any of a variety of secret sharing schemes. In some embodiments, the secret value allows the configuration device programmer 350 to access various router (e.g., 202) secure data path configuration information. In other embodiments, the secret value enables programming of an external configuration device.

In block 610, new information is generated for programming into an external configuration device. Such information includes, router secure data path information in embedded configuration data 276, and in some embodiments, authentication data 272 and/or secret share 452. In some embodiments, the configuration data 276 is encrypted. Thus, in such embodiments, the method of FIG. 6 must be performed by a programmer 350 that has the requisite encryption key. In some embodiments, the router associated with the configuration device has the encryption key and can serve as the device programmer. In some such embodiments, the encryption key may be accessible to the programmer via the secret value computed in block 608, or other means. In block 612, the new information is written into an external configuration device.

Embodiments of the present disclosure allow for programming of various numbers of external configuration devices without relying on a central authority. A sub-network to which a configuration device programmer is applied may be defined to include a manageable number of routers grouped according to corporate structure, geographical proximity, network topology, or any other convenient grouping. The external configuration devices applicable to the routers of the network/sub-network may be locally managed by requiring that a plurality of programmed external configuration devices be presented to a configuration device programmer 350 for programming, and thus that a plurality of users responsible for those configuration devices act in concert. Thus, no central authority is required and network security is maintained while simplifying network management at least in cases where an external configuration device must be generated or replaced.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a plurality of programmed external configuration devices, wherein each programmed external configuration device contains at least a portion of a definition of a secure data path between a first router and a second router, and each programmed external configuration device can be detachably coupled to a first router to create a secure data path between the first router and a second router; and
    a configuration device programmer that writes a secure data path definition into a selected external configuration device;
    wherein the configuration device programmer writes the secure data path definition into the selected external configuration device if a predetermined number of programmed external configuration devices are coupled to the configuration device programmer.

2. The system of claim 1, wherein a router comprises the configuration device programmer.

3. The system of claim 1, wherein the configuration device programmer writes a secure data path definition to the selected external configuration device for a router not included in a previously existing network.

4. The system of claim 1, wherein each programmed external configuration device comprises information for determining a secret value, wherein a predetermined number of programmed external configuration devices are coupled to the configuration device programmer to enable the configuration device programmer to determine the secret value, and the configuration device programmer generates the secure data path information based, at least in part, on the secret value.

5. The system of claim 4, wherein the configuration device programmer can determine the secret value only if at least the predetermined number of programmed external configuration devices are coupled thereto.

6. The system of claim 1, wherein the configuration device programmer writes a secure data path definition into the selected external configuration device that is identical to a secure data path definition previously written into an external configuration device.

7. The system of claim 1, wherein the configuration device programmer writes a secure path definition to each external configuration device corresponding to a router in a network.

8. The system of claim 1, wherein the configuration device programmer writes a secure data path definition to the selected external configuration device based, at least in part, on information read from another external configuration device.

9. The system of claim 1, wherein the configuration device programmer authenticates identities of users of the predetermined number of programmed external configuration devices coupled to the configuration device programmer and writes the secure data path definition into the selected external configuration device based, at least in part, on the authentication.

10. The system of claim 1, wherein the selected external configuration device further comprises an interface for entry of external configuration device user authentication data.

11. The system of claim 1, wherein the configuration device programmer comprises an interface for entry of external configuration device user authentication data.

12. A method, comprising:
    detecting the coupling of a predetermined plurality of programmed external configuration devices to a configuration device programmer, each programmed external configuration device containing secure data path information that, at least in part, defines a secure data path between two network devices; and
    writing secure data path information to a selected external configuration device based, at least in part, on the detection of coupling of the predetermined plurality of programmed external configuration devices to the configuration device programmer.

13. The method of claim 12, further comprising authenticating a user of each programmed external configuration device coupled to the configuration device programmer, and basing, at least in part, the writing of the secure data path information to the external configuration device, on the authentication.

14. The method of claim 12, further comprising generating the secure data path information based, at least in part, on serially coupling the predetermined plurality of programmed external configuration devices to the configuration device programmer.

15. The method of claim 12, further comprising determining the secure data path information to write based, at least in part, on secure data path information read from a programmed external configuration device coupled to the configuration device programmer.

16. The method of claim 12, further comprising determining the secure data path information to write based, at least in part, on a secret value computed from information read from the predetermined plurality of programmed external configuration devices coupled to the configuration device programmer, wherein the secret value is computed only if at least the predetermined plurality of programmed external configuration devices are coupled to the configuration device programmer.

17. The method of claim 12, further comprising using the secret value to access secure data path information.

18. A router configuration system, comprising:
an external configuration device that can be programmed to store a definition of a secure data path between a first router and a second router, a programmed external configuration device can be detachably coupled to the first router to create the secure data path between the first router and the second router; and
configuration device programmer configured to write the secure data path definition to the external configuration device;
wherein coupling a predetermined plurality of programmed external configuration devices to the configuration device programmer enables the configuration device programmer to write the secure data path definition into the external configuration device.

19. The router configuration system of claim 18, wherein the configuration device programmer writes the secure data path definition to the external configuration device based, at least in part, on authentication of users of the predetermined plurality of programmed external configuration devices.

20. The router configuration system of claim 18, wherein each programmed external configuration device comprises information for determining a secret value shared among a plurality of programmed external configuration devices, and the configuration device programmer reads the information from the predetermined plurality of programmed external configuration devices, uses the information to determine the secret value, and uses the secret value to generate the secure data path definition.

* * * * *